(12) United States Patent
Bendak et al.

(10) Patent No.: US 6,961,366 B1
(45) Date of Patent: Nov. 1, 2005

(54) SYSTEM AND METHOD FOR REDUNDANT PATH CONNECTIONS IN DIGITAL COMMUNICATIONS NETWORK

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1032 days.

(21) Appl. No.: 09/753,185

(22) Filed: Jan. 2, 2001

(51) Int. Cl.$^7$ ............................................. H04L 25/60
(52) U.S. Cl. ........................... 375/214; 370/315; 455/7
(58) Field of Search ...................... 375/211, 212, 213, 375/214; 370/315, 316, 320, 492, 801; 400/7, 400/8, 9; 455/11.1, 12.1, 13.1, 13.2, 13.3, 455/13.4

(56) References Cited

U.S. PATENT DOCUMENTS

| | | | |
|---|---|---|---|
| 5,251,205 A | 10/1993 | Callon et al. | |
| 5,490,252 A | 2/1996 | Macera et al. | |
| 5,568,471 A | 10/1996 | Hershey et al. | |
| 5,661,763 A | 8/1997 | Sands | |
| 5,666,108 A | 9/1997 | Duffy | |
| 5,778,000 A | 7/1998 | Dosiere et al. | |
| 5,793,976 A | 8/1998 | Chen et al. | |
| 5,854,699 A | 12/1998 | Olshansky | |
| 5,875,396 A | 2/1999 | Stockton et al. | |
| 5,924,022 A * | 7/1999 | Beasley et al. | 455/218 |
| 5,949,818 A * | 9/1999 | Chiou | 375/211 |
| 5,982,743 A * | 11/1999 | Kusano | 370/217 |
| 6,006,069 A | 12/1999 | Langston | |
| 6,643,255 B1 * | 11/2003 | Anhorn | 370/222 |

* cited by examiner

*Primary Examiner*—Chieh M. Fan
(74) *Attorney, Agent, or Firm*—INCAPLAW; Terrance A. Meador

(57) ABSTRACT

A system and method for providing redundancy in an integrated circuit (IC) relay device has been disclosed. The relay device accepts communications on a first and second receive path. The relay device monitors communications on both the receive paths, and selects a path having a high degree of integrity. Likewise, the relay selectively supplies communications on a first and second transmit path. The relay device selects the transmit path having the proper measure of communication integrity. Communications integrity can be based upon internally monitored criteria such as bit error rate, synchronization, clock signals, and forward error correction. Alternately, the integrity is determined external to the relay, and the relay responds to external switch commands.

26 Claims, 6 Drawing Sheets

SYSTEM AND METHOD FOR REDUNDANT PATH CONNECTIONS IN DIGITAL COMMUNICATIONS NETWORK

RELATED APPLICATIONS

This application contains material related to the following commonly assigned U.S. patent applications incorporated herein by reference:

Ser. No. 09/753,184 filed Jan. 2, 2001 for "SYSTEM AND METHOD FOR DIAGNOSTIC MULTICAST SWITCHING"

Ser. No. 09/753,183 filed Jan. 2, 2001 for "BIDIRECTIONAL LINE SWITCH RING SYSTEM AND METHOD."

BACKGROUND OF THE INVENTION

1. Field of the Invention

This invention relates generally to a digital communications network and, more particularly, to a system and method for providing redundancy between nodes of the communication network

2. Description of the Related Art

Redundancy is often applied in mission critical networks, or where down time cannot be tolerated. Although an asset in any system, redundancy may be difficult to arrange in some systems due to issues such as cost, throughput efficiency, and space constraints. All of these constraints work against the application of redundancy in optical networks, such as the synchronous optical network (SONET) for example.

Many emerging high-speed optical transmission systems are still in the stage of development, while longer existing systems have undergone constant changes in standards. As a result, there is little or no standard practice as to how redundancy should be implemented. Neither are there well-defined criteria to trigger primary units with redundant units, or even what diagnostic features are to be incorporated in triggering the selection of a redundant unit.

It would be advantageous if redundancy could be implemented at the chip level, as opposed to the box level, so that size and power constraints are eliminated as system level issues.

It would be advantageous if nodal receiving and transmitting units could be made programmable so that redundancy selection criteria could be changed or customized to individual users.

SUMMARY OF THE INVENTION

Accordingly, the invention is an integrated circuit (IC) device which has programmable features to set the active data paths through the device, and to monitor both the selected and non-selected data paths for integrity. The device has two identical inputs and two identical outputs. There are two main blocks within the device, one for encoding and one for decoding. The connection of inputs to the decoder block is programmable, as is the connection of the encoder block to the outputs. The purpose of this invention is to provide 1+1 input and output redundancy in a device targeted at optical networks, so that if an input or output device fails, the network can continue to operate. The invention also integrates diagnostic features and line monitoring support to aid with switching decisions and network troubleshooting. The advantage of this invention is that it provides the user the ability to create redundancy in the network with a minimum of required space, power, and extra equipment. In addition to this, installations are easy to diagnose because of the intergrated loopback functionality. The configurability offered by the invention allows savings in space, required test equipment, and the cost of customer units.

A method is also provided for redundancy in an IC relay device. The method comprises: receiving communications on a first receive path and a second receive path; monitoring the first and second receive paths for communication integrity; and, selecting a receive path in response to monitoring the first and second receive paths for communication integrity. Likewise, the method comprises: monitoring the communications on first and second transmit paths for communication integrity; and, selecting a transmit path in response to monitoring communications integrity on the first and second transmit paths.

Typically, the communications are encoded with forward error correction (FEC), and the method further comprises: decoding the received communications; and, correcting byte errors in the decoded communications using the forward error correction. Monitoring the first and second receive paths for communication integrity includes monitoring the corrected byte errors in the decoded communications in the first and second receive paths. Details of the above-described redundancy method and IC relay device are explained below.

DETAILED DESCRIPTION OF THE PREFERRED EMBODIMENTS

Figure 1:
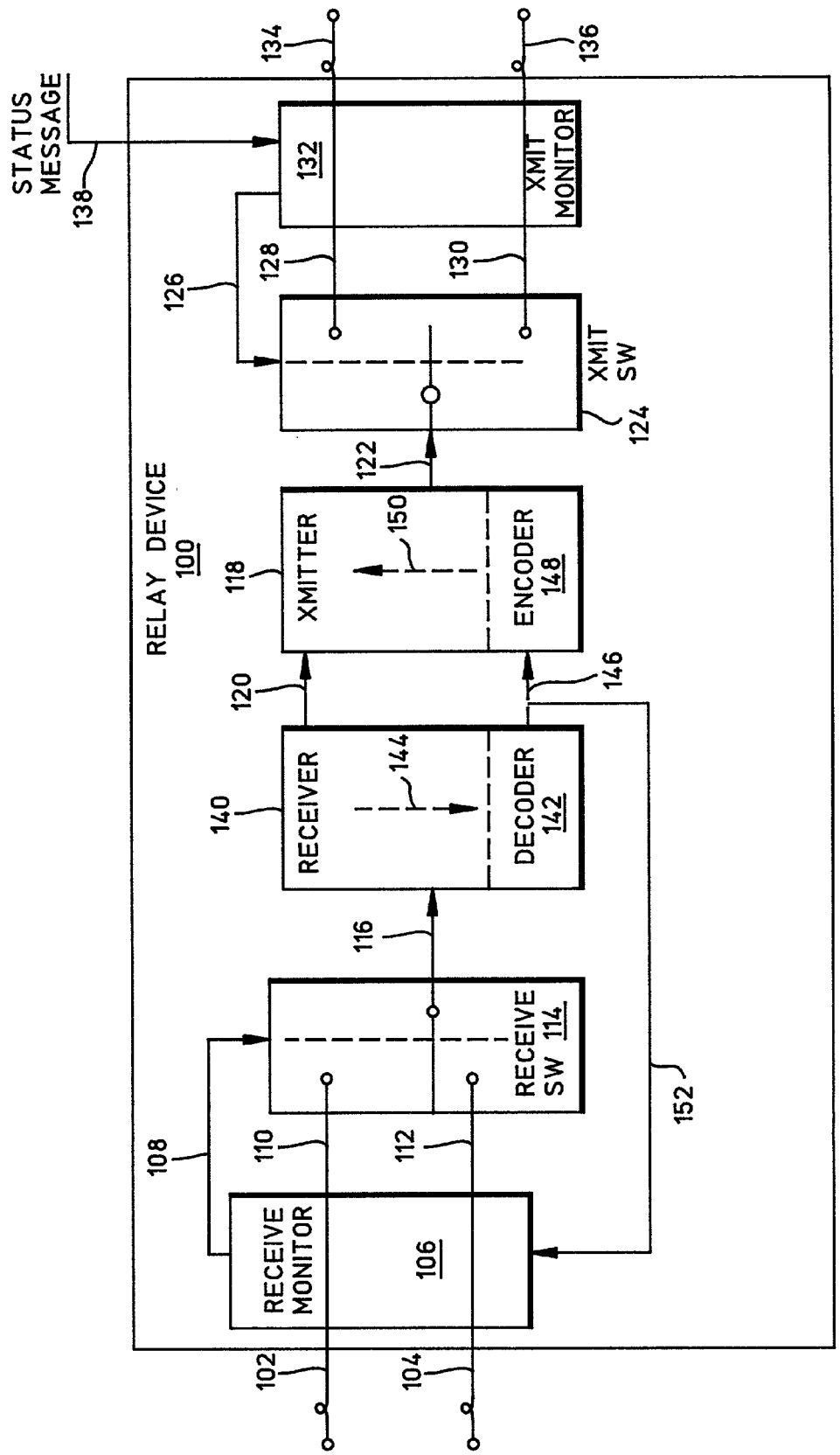
FIG. 1 is a schematic block diagram of an integrated circuit relay device with redundancy.

FIG. 1 is a schematic block diagram of an integrated circuit relay device that provides redundancy. In short, the device 100 has a single line, dual redundant configuration that provides 1+1 redundancy for repeater and transponder applications. Communications on a primary (active), or first receive path 102 are constantly monitored for integrity while in operation. Simultaneously, communications on a secondary (standby), or second receive path 104 are monitored for correct formatting. The results of the monitoring prevent a path switch from occurring, from the first receive path 102 to the second receive path 104, for example, unless the second receive path 104 is healthy.

The IC digital communication relay device 100 comprises a receive monitor 106 having a first input connected to the first receive path on line 102 and a second input connected to the second receive path on line 104. The receive monitor 106 monitors the integrity of communications on the first and second receive paths 102/104 and supplies a control signal responsive to the communication integrity at a first output on line 108. The receive monitor 106 supplies the communications from the first receive path on line 102 to a second output on line 110 and communications from the second receive path on line 104 to a third output on line 112.

A receive switch 114 has a first input connected to the receive monitor second output on line 110 and a second input connected to the receive monitor third output on line 112. The receive switch 114 has a third input connected to the receive monitor first output on line 108. The receive switch 114 has an output on line 116 to supply communications from the selected input in response to the control signal on line 108.

Typically, the signals received on the first receive path and the second receive path on lines 102/104 are optical, or electrical signals that have been converted from optical, such as those related to SONET. However, the invention is not limited to any particular communication protocol. These communications are transported using a digital wrapper or digital frame structure that includes overhead (OH), payload, and forward error correction (FEC) sections. The receive monitor 106 monitors integrity criteria selected from the group including overhead bytes, synchronization status, loss of clock, bit error rate, and signal to noise ratio.

For example, the health of a communication can be a determination based upon whether certain number of overhead bytes, byte locations, and byte values are found in the overhead section. In other aspects of the invention, the receive monitor 106 monitors the correct presence of frame synchronization bytes (FSBs) in the overhead section. In either case, a bit error rate (BER) can be established to determine how many errors are acceptable for a byte to be recognized. The BER of the payload section, either before or after FEC, is a health criteria in some aspects of the invention. The loss of signal and signal strength can also be monitored as health criteria.

A transmitter 118 has a first input on line 120 to accept communications for transmission and supplies the communications on an output on line 122. A transmit switch 124 has a first input connected to the transmitter output on line 122, a second input to receive a control signal on line 126, a first output on line 128, and a second output on line 130. The transmit switch 124 selectively supplies communications on lines 128 and 130 in response to the control signal on line 126.

A transmit monitor 132 has a first input connected to the transmit switch first output on line 128 and a second input connected to the transmit switch second output on line 130. The transmit monitor 132 monitors the integrity of communications on the first and second inputs 128/130 and supplies a control signal responsive to the communication integrity at a first output on line 126. The transmit monitor 132 supplies the communications from the first input on line 128 to a first transmit path on line 134 and communications from the second input on line 130 to a second transmit path on line 136. The transmit monitor is able to monitor for problems that occur in the transmission path downstream in a relatively close vicinity to device 100. To the extent that the downstream communications can be monitored, the transmit monitor is said to monitor communication integrity on lines 134 and 136.

The transmitted communications on lines 134 and 136 are digital frame structures having overhead, payload, and forward error correction sections. Therefore, the transmit monitor 132 monitors integrity criteria selected from the group including overhead byte recognition, frame synchronization bytes, clock loss, bit error rate, and signal to noise ratio.

However, in some aspects of the invention, status messages are received from destination nodes in the network and used to determine communication integrity. The transmit monitor 132 has a third input on line 138 to receive status messages concerning the integrity of communications transmitted on the first and second transmit paths 134/136. The transmit monitor 132 supplies control signals on line 126 responsive to the received status messages on line 138. Therefore, the transmit switch 124 selects an output in response to the status messages received at the transmit monitor third input on line 138.

Typically, the received framed communications are encoded with forward error correction (FEC). A receiver 140 has an input connected to the receive switch output on line 116 to process communications. In the simplest aspect of the invention, the receiver has an output on line 120 to supply processed communications received on the selected receive path. Alternately, the received message is corrected. A decoder 142 has an input selectively connected to the receiver output on line 144 and an output on line 146 to supply decoded communications, where byte errors in the decoded communications have been corrected using the forward error correction. An encoder 148 has an input selectively connected to the decoder output on line 146 and an output connected to the transmitter input on line 150 to supply encoded communications with forward error correction. To signify the selective nature of the decoding and encoding operations, the decoder and encoder connections have been drawn with dotted lines.

In some aspects of the invention, the receive monitor 106 has a third input connected to a decoder output on line 152. The receive monitor 106 supplies a receive switch control signal on line 108 in response to the number of byte error corrections made by the decoder 142. The receive switch 114 selects an input in response to the number of byte error corrections made by decoder 142.

Figure 2:
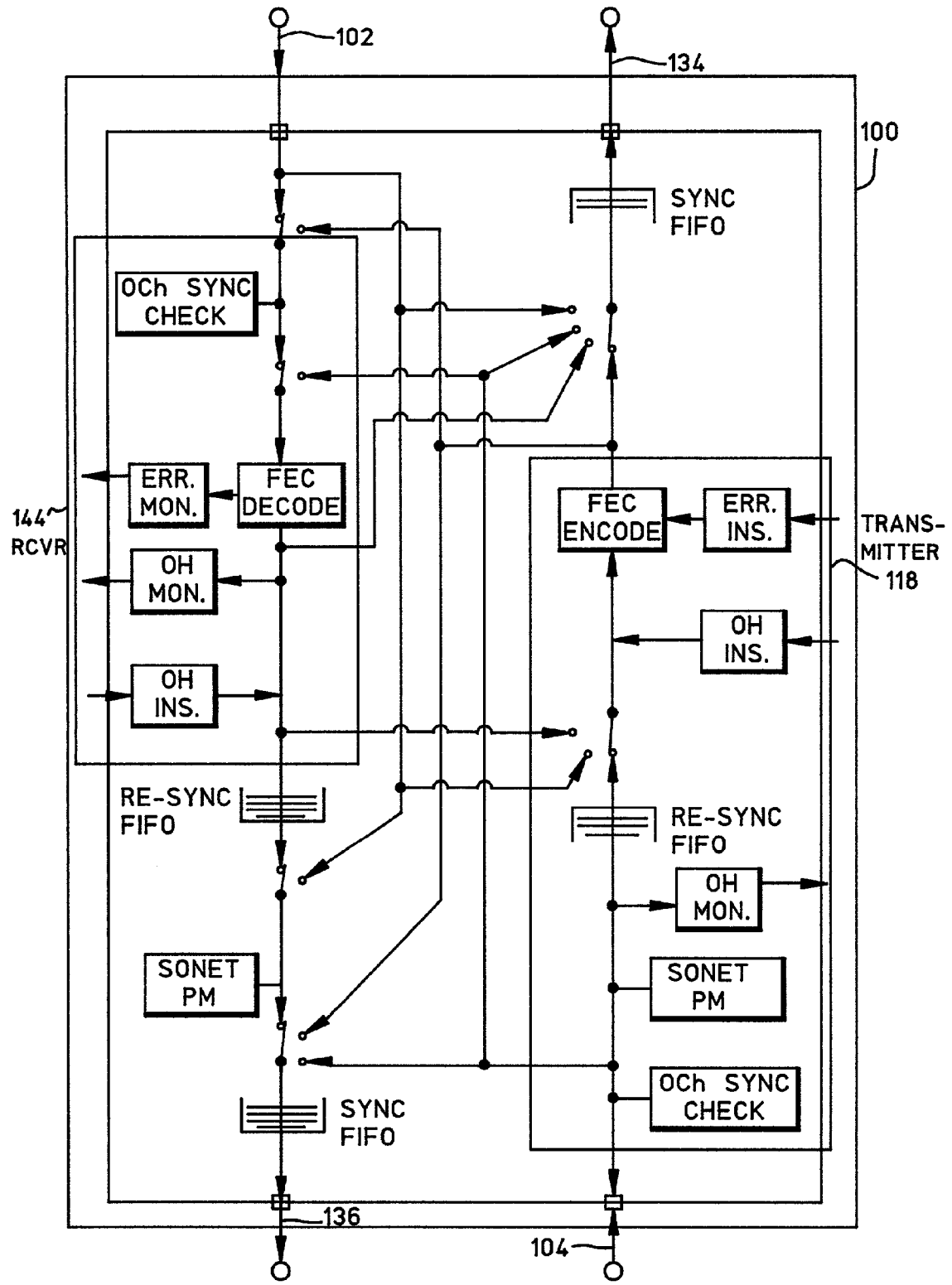
FIG. 2 is a more detailed illustration of FIG. 1, more accurately depicting the selectable connectivity between paths and relay functions that provide redundancy.

FIG. 2 is a more detailed illustration of FIG. 1, more accurately depicting the selectable connectivity between paths and relay functions that provide redundancy. In addition, FIG. 2 illustrates the many different loopbacks that can be configured to aid in diagnosing connectivity within the network.

Figure 3:
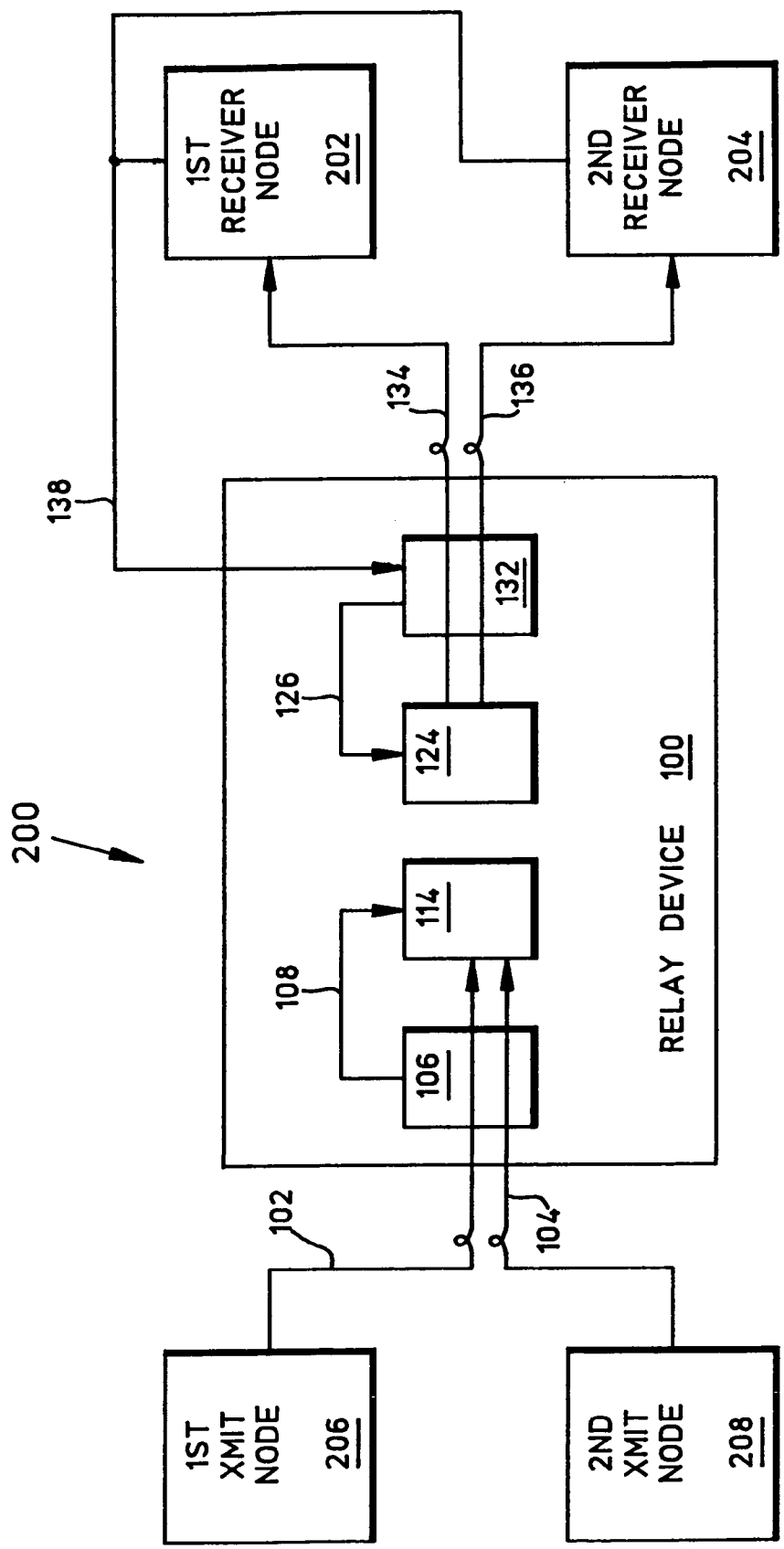
FIG. 3 is a schematic block diagram illustrating a system of integrated circuit (IC) digital communication relay devices for providing redundancy.

FIG. 3 is a schematic block diagram illustrating a system of integrated circuit (IC) digital communication relay devices for providing redundancy. The system 200 includes a first relay 100, as described above, that includes a transmit switch 124 and a transmit monitor 132. The system also includes a first receiver node 202 having an input connected to the transmit monitor second output on line 134 to receive communications, and an output connected to the third input of the first relay transmit monitor 132 on line 138 to supply status messages concerning the integrity of the received communications.

A second receiver node 204 has an input connected to the transmit monitor third output on line 136 to receive communications. The second receiver node 204 has an output connected to the third input of the first relay transmit monitor 132 on line 138 to supply status messages concerning the integrity of the received communications.

The first relay transmit monitor 132 supplies a control signal on line 126 to select a transmitter switch output, in response to the status messages from the first and second receiver nodes on line 138.

Likewise, the first relay device 100 includes a receive switch 114 and receive monitor 106 elements as described above with FIG. 1. A first transmitter node 206 has an output connected to the receive monitor first input on line 102 to transmit communications. A second transmitter node 208 has an output connected to the receive monitor second input on line 104 to transmit communications. The receive monitor 106 supplies a control signal on line 108 to select a receive switch input in response to monitoring communication integrity.

Figure 4:
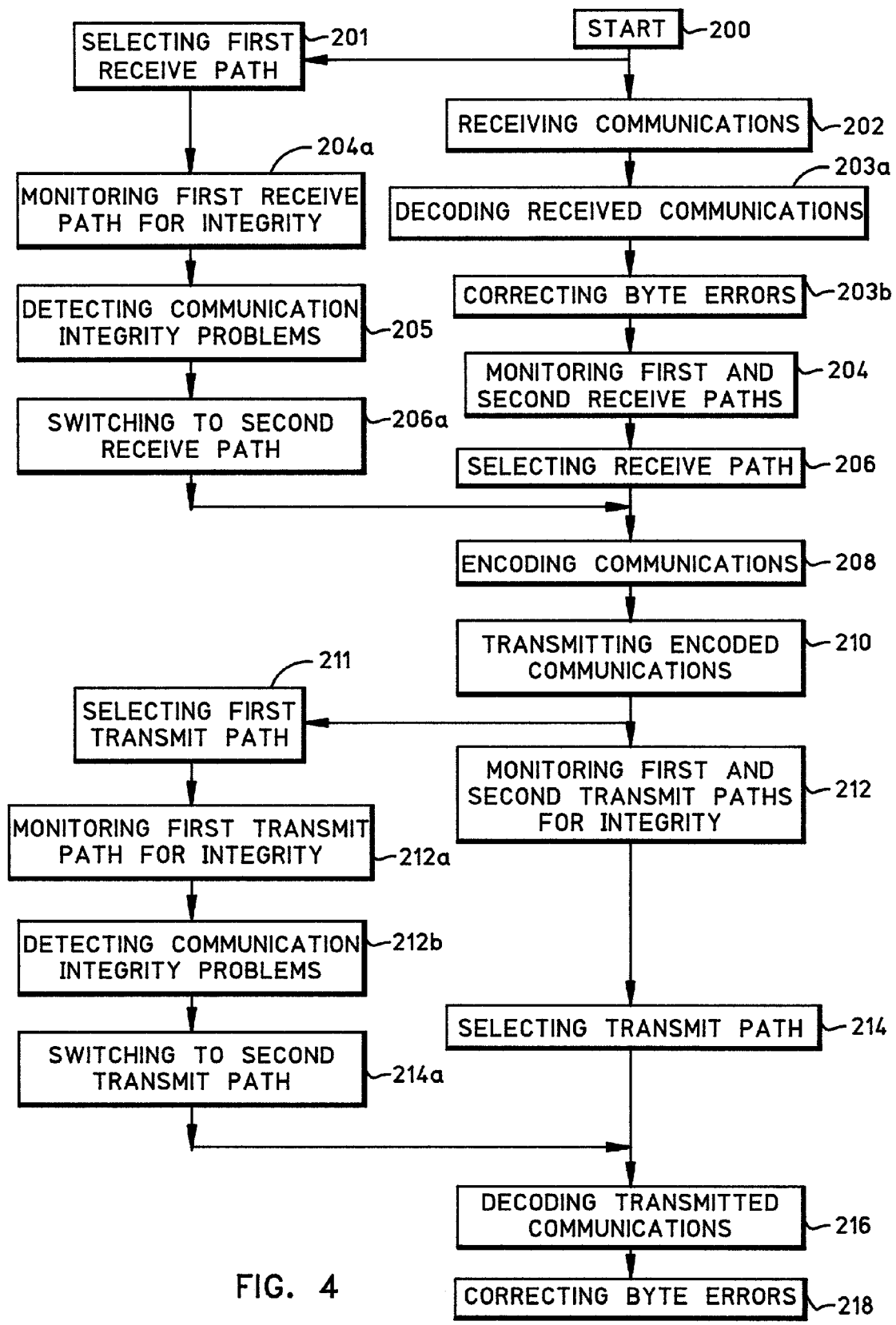
FIG. 4 is a flowchart depicting a method for providing redundancy in an integrated circuit (IC) digital communication relay device.

FIG. 4 is a flowchart depicting a method for providing redundancy in an integrated circuit (IC) digital communication relay device. Although the method is depicted as a sequence of numbered steps for clarity, no order should be inferred from the numbering unless explicitly stated. The method begins with Step 200. Step 202 receives communications on a first receive path and a second receive path. Step 204 monitors the first and second receive paths for communication integrity. Step 206 selects a receive path in response to monitoring the first and second receive paths for communication integrity.

In some aspects of the invention, the communications are encoded with forward error correction (FEC). Step 203*a* decodes the received communications. Step 203*b* corrects byte errors in the decoded communications using the forward error correction. Monitoring the first and second receive paths for communication integrity in Step 204 includes monitoring the corrected byte errors in the decoded communications in the first and second receive paths.

Following selecting a path in response to monitoring communications in Step 206, Step 208 encodes the communications with forward error correction. Step 210 transmits the encoded communications.

In some aspects of the invention, transmitting the encoded communications in Step 210 includes transmitting the encoded communications on a first transmit path and second transmit path. The method further comprises monitoring the communications on the first and second transmit paths for communication integrity in Step 212. Step 214 selects a transmit path in response to monitoring communications integrity on the first and second transmit paths.

In some aspects, Step 216 decodes the transmitted communications. Step 218 corrects byte errors in the decoded transmitted communications using the forward error correction. Monitoring the first and second transmit paths for communication integrity in Step 212 includes monitoring the corrected byte errors in the decoded transmit communications.

As way of an example, in some aspects of the invention Step 211 selects the first transmit path. Step 212*a* monitors the first transmit path for communication integrity. Step 212*b* detects communication integrity problems in the first transmit path. Step 214*a* switches to the second transmit path.

In some aspects of the invention, the communications are organized in a digital frame structure with overhead, payload, and forward error correction sections. Monitoring the first and second receive path in Step 204 includes using the forward error correction to determine the bit error rate of the decoded communications. Selecting a receive path in response to monitoring the first and second receive paths for communication integrity in Step 206 includes selecting a receive path in response to the bit error rate. In some aspects, monitoring the first and second transmit paths for communication integrity in Step 204 includes monitoring the overhead sections for frame synchronization bytes, and selecting a path in Step 206 includes selecting a path in response to monitoring the FSBs.

In another example, Step 201 selects the first receive path. Step 204 monitors the first receive path for communication integrity. Step 205 detects communication integrity problems in the first receive path. Step 206*a* switches to the second receive path.

Figure 5:
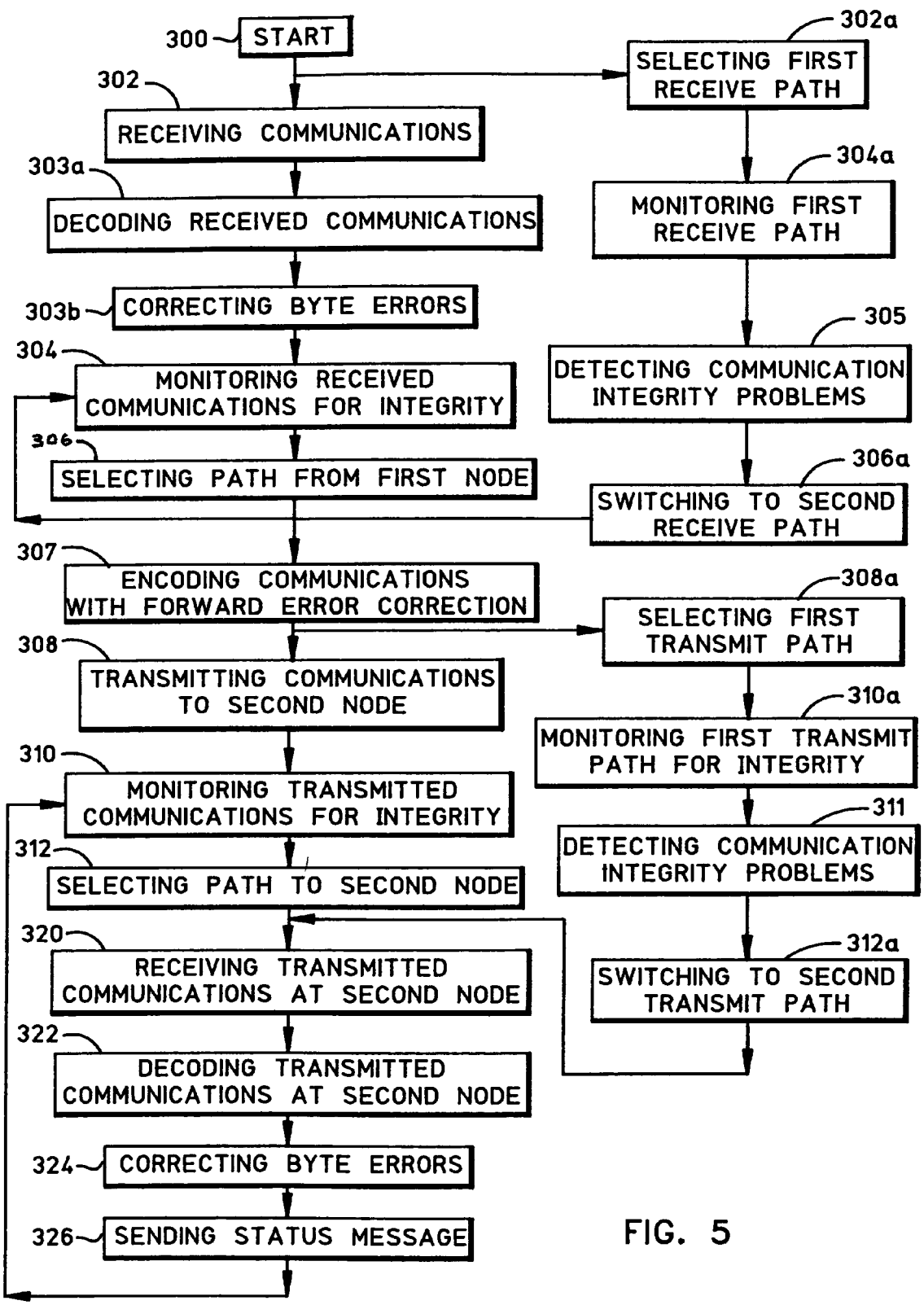
FIG. 5 is a flowchart depicting a method for providing redundancy in an IC digital communication relay device.

FIG. 5 is a flowchart depicting a method for providing redundancy in an IC digital communication relay device. The method begins with Step 300. Step 302 receives communications from a first node. Step 304 monitors the received communications for communication integrity. Step 306 selects a path from the first node in response to monitoring communication integrity.

In some aspects of the invention, Step 308 transmits the communications to a second node. Step 310 monitors the transmitted communications for communication integrity. Step 312 selects a path to the second node in response to monitoring communication integrity.

In some aspects, receiving communications from the first node in Step 302 includes receiving communications encoded with forward error correction (FEC). Step 303*a* decoding the received communications. Step 303*b* corrects byte errors in the decoded communications using the forward error correction. Monitoring the received communications for communication integrity in Step 304 includes monitoring the corrected byte errors in the received and decoded communications.

In some aspects, Step 307, following the decoding of the received communications, encodes the communications with forward error correction. Transmitting the communications to a second node in Step 308 includes transmitting encoded communications.

In some aspects, transmitting the encoded communications in Step 308 includes transmitting the encoded communications on a first transmit path and second transmit path. Monitoring the transmitted communications for communication integrity in Step 310 includes monitoring the transmitted communications on the first and second transmit paths for communication integrity. Selecting a transmit path to the second node in response to monitoring communication integrity in Step 312 includes selecting a transmit path in response to monitoring communications integrity on the first and second transmit paths.

In some aspects of the invention, Step 320 receives the transmitted communications at the second node. Step 322 decodes the transmitted communications at the second node. Step 324 corrects byte errors in the transmitted and decoded communications, at the second node, using the forward error correction. Step 326 sends a status message from the second node with an indication of byte error corrections. Monitoring the transmitted communications for communication integrity in Step 310 includes receiving the status message from the second node.

In some aspects, Step 308*a* selecting the first transmit path. Step 310*a* monitors the first transmit path for communication integrity. Step 311 detects communication integrity problems in the first transmit path. Step 312*a* switches to the second transmit path.

In some aspects of the invention, receiving communications in Step 302 includes receiving communications on a first receive path and second receive path. Monitoring the received communications for communication integrity in Step 304 includes monitoring the received communications on the first and second receive paths for communication integrity. Selecting a receive path in response to monitoring communication integrity in Step 306 includes selecting a receive path in response to monitoring communications integrity on the first and second receive paths.

In some aspects, Step 302*a* selects the first receive path. Step 304*a* monitors the first receive path for communication integrity. Step 305 detects communication integrity problems in the first receive path. Step 306a switches to the second receive path.

Some aspects of the invention include communications organized in a digital frame structure with overhead, payload, and forward error correction sections. Monitoring communications in Step 304a includes monitoring overhead bytes in the overhead section.

In some aspects, monitoring the overhead section for overhead bytes in Step 304a includes monitoring the overhead sections for frame synchronization bytes.

Figure 6:
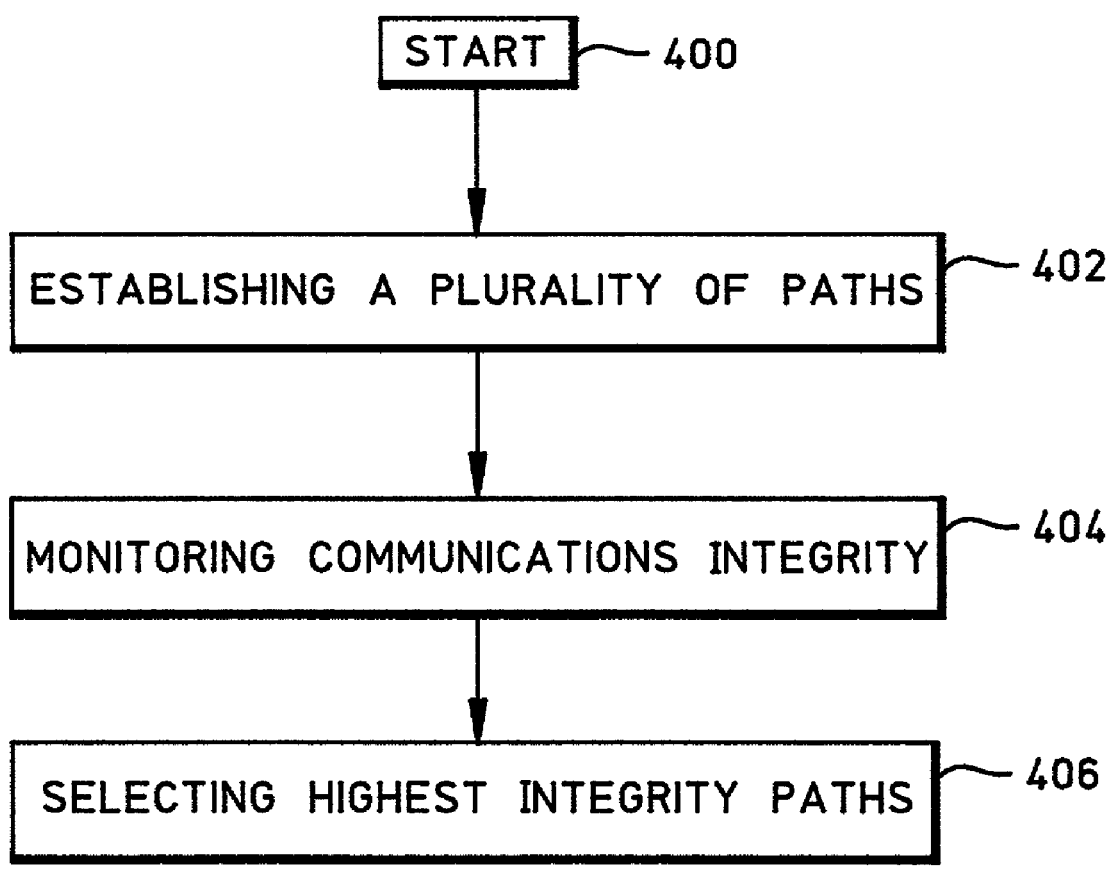
FIG. 6 is a flowchart depicting an integrated circuit relay device to provide a method for maintaining a high integrity communication path between network nodes.

FIG. 6 is a flowchart depicting an integrated circuit relay device to provide a method for maintaining a high integrity communication path between network nodes. The method begins at Step 400. Step 402 establishes a plurality of paths between a first node and a second node. Step 404 monitors the integrity of communications on the plurality of paths. Step 406 selects the paths with the highest integrity.

A system and method of providing redundancy in a relay IC have been provided above. The invention has been described using some examples of switching in receive and transmit paths, responsive to monitoring communication integrity. However, the invention is not limited to any specific type of switching criteria. Switching in response to external signals, or internal signals generated for diagnosis and testing is also possible. Other variations and embodiments of the invention will occur to those skilled in the art.

We claim:

1. In an integrated circuit (IC) digital communication relay device, a method for providing redundancy comprising:
   receiving communications encoded with forward error correction (FEC) on a first receive path and a second receive path;
   decoding the received communications;
   correcting byte errors in the decoded communications using the forward error correction;
   monitoring the first and second receive paths for communication integrity by monitoring the corrected byte errors in the decoded communications in the first and second receive paths; and
   selecting a receive path in response to monitoring the first and second receive paths for communication integrity.

2. The method of claim 1 further comprising:
   following selecting a path in response to monitoring communications, encoding the decoded communications with forward error correction; and
   transmitting the encoded communications.

3. The method of claim 2 wherein transmitting the encoded communications includes transmitting the encoded communications on a first transmit path and second transmit path; and
   the method further comprising:
   monitoring the communications on the first and second transmit paths for communication integrity; and
   selecting a transmit path in response to monitoring communications integrity on the first and second transmit paths.

4. The method of claim 3 further comprising:
   decoding the transmitted communications
   correcting byte errors in the decoded transmitted communications using the forward error correction; and
   wherein monitoring the first and second transmit paths for communication integrity includes monitoring the corrected byte errors in the decoded transmit communications.

5. The method of claim 4 further comprising:
   selecting the first transmit path;
   monitoring the first transmit path for communication integrity;
   detecting communication integrity problems in the first transmit path; and
   switching to the second transmit path.

6. The method of claim 1 in which the communications are organized in a digital frame structure with overhead, payload, and forward error correction sections;
   wherein monitoring the first and second receive paths includes using the forward error correction to determine the bit error rate of the decoded received communications; and
   wherein selecting a receive path in response to monitoring the first and second receive paths for communication integrity includes selecting a receive path in response to the bit error rate.

7. The method of claim 6 wherein monitoring the first and second receive paths for communication integrity includes monitoring the overhead sections for frame synchronization bytes; and
   wherein selecting a receive path in response to monitoring the first and second receive paths includes selecting a path in response to monitoring frame synchronization bytes.

8. The method of claim 1 further comprising:
   selecting the first receive path;
   monitoring the first receive path for communication integrity;
   detecting communication integrity problems in the first receive path; and
   switching to the second receive path.

9. In an integrated circuit (IC) digital communication relay device, a method for providing redundancy comprising:
   receiving communications encoded with forward error correction (FEC) from a first node;
   decoding the received communications;
   correcting byte errors in the decoded communications using the forward error correction;
   monitoring the received communications for communication integrity by monitoring the corrected byte errors; and
   selecting a path from the first node in response to monitoring communication integrity.

10. The method of claim 9 further comprising:
    transmitting the communications to a second node;
    monitoring the transmitted communications for communication integrity; and
    selecting a path to the second node in response to monitoring communication integrity.

11. The method of claim 10 further comprising:
    following the decoding of the received communications, encoding the decoded communications with forward error correction; and
    wherein transmitting the communications to a second node includes transmitting encoded communications.

12. The method of claim 11 wherein transmitting the encoded communications includes transmitting the encoded communications on a first transmit path and second transmit path;
    wherein monitoring the transmitted communications for communication integrity includes monitoring the transmitted communications on the first and second transmit paths for communication integrity; and selecting a transmit path to the second node in response to monitoring communication integrity includes selecting a transmit path in response to monitoring communications integrity on the first and second transmit paths.

13. The method of claim 12 further comprising:
receiving the transmitted communications at the second node; and
the method further comprising:
decoding the transmitted communications at the second node;
correcting byte errors in the transmitted and decoded communications, at the second node, using the forward error correction;
sending a status message from the second node with an indication of byte error corrections; and
wherein monitoring the transmitted communications for communication integrity includes receiving the status message from the second node.

14. The method of claim 13 further comprising:
selecting the first transmit path;
monitoring the first transmit path for communication integrity;
detecting communication integrity problems in the first transmit path; and
switching to the second transmit path.

15. The method of claim 14 wherein receiving communications includes receiving communications on a first receive path and second receive path;
wherein monitoring the received communications for communication integrity includes monitoring the received communications on the first and second receive paths for communication integrity; and
selecting a receive path in response to monitoring communication integrity includes selecting a receive path in response to monitoring communications integrity on the first and second receive paths.

16. The method of claim 15 further comprising:
selecting the first receive path;
monitoring the first receive path for communication integrity;
detecting communication integrity problems in the first receive path; and
switching to the second receive path.

17. The method of claim 10 in which the communications are organized in a digital frame structure with overhead, payload, and forward error correction sections;
wherein monitoring communications includes monitoring overhead bytes in the overhead section.

18. The method of claim 17 wherein monitoring the overhead section for overhead bytes includes monitoring the overhead sections for frame synchronization bytes.

19. An integrated circuit (IC) digital communication relay device for providing redundancy, the device comprising:
a receive monitor having a first input connected to a first receive path and a second input connected to a second receive path, the receive monitor monitoring the integrity of communications including digital frame structures having overhead, payload, and forward error correction sections on the first and second receive paths by monitoring integrity criteria selected from the group including overhead bytes, synchronization status, loss of clock, bit error rate, and signal to noise ratio and supplying a control signal responsive to the communication integrity at a first output, the receive monitor supplying the communications from the first receive path to a second output and communications from the second receive path to a third output; and a receive switch having a first input connected to the receive monitor second output, a second input connected to the receive monitor third output, and a third input connected to the receive monitor first output, and an output to supply communications from the selected input in response to the control signal.

20. The device of claim 19 further comprising:
a transmit switch having a first input to accept communications for transmission, a second input to receive a control signal, a first output, and a second output to selectively supply communications in response to the control signal; and
a transmit monitor having a first input connected to the transmit switch first output and a second input connected to the transmit switch second output, the transmit monitor monitoring the integrity of communications on the first and second inputs and supplying a control signal responsive to the communication integrity at a first output, the transmit monitor supplying the communications from the first input to a first transmit path and communications from the second input to a second transmit path.

21. The device of claim 20 further comprising:
a transmitter having an input to accept communications for transmission and supplying the communications on a first output connected to the transmit switch first input.

22. The device of claim 21 in which the transmitted communications are digital frame structures having overhead, payload, and forward error correction sections; and
wherein the transmit monitor monitors integrity criteria selected from the group including overhead byte recognition, frame synchronization bytes, clock loss, bit error rate, and signal to noise ratio.

23. The device of claim 21 wherein the transmit monitor has a third input to receive status messages concerning the integrity of communications transmitted on the first and second transmit paths;
wherein the transmit monitor supplies control signals responsive to the received status messages; and
wherein the transmit switch selects an output in response to the status messages received at the transmit monitor third input.

24. The device of claim 23 in which received communications are encoded with forward error correction (FEC);
the device further comprising:
a receiver having an input connected to the receive switch output to process communications, the receiver having an output to supply processed communications received on the selected receive path;
a decoder having an input selectively connected to the receiver output and an output to supply decoded communications, where byte errors in the decoded communications have been corrected using the forward error correction; and
an encoder having an input selectively connected to the decoder output, and an output connected to the transmitter input to supply encoded communications with forward error correction.

25. The device of claim 24 wherein the receive monitor has a third input connected to the decoder output, the receive monitor supplying a receive switch control signal in response to the number of byte error corrections made by the decoder; and
wherein the receive switch selects an input in response to the number of byte error corrections.

26. A system of integrated circuit (IC) digital communication relay devices for providing redundancy, the system comprising:
- a first relay including:
  - a transmit switch having a first input to accept communications for transmission, a second input to receive a control signal, a first output, and a second output to selectively supply communications in response to the control signal; and
  - a transmit monitor having a first input connected to the transmit switch first output, a second input connected to the transmit switch second output, and a third input to receive communication integrity status messages, the transmit monitor monitoring the integrity of communications on the first and second inputs and supplying the control signal responsive to the communication integrity at a first output, the transmit monitor supplying the communications from the first input at a second output to a first transmit path and communications from the second input at a third output to a second transmit path;
- a first receiver node having an input connected to the transmit monitor second output to receive communications and an output connected to third input of the first relay transmit monitor to supply status messages concerning the integrity of the received communications; and
- a second receiver node having an input connected to the transmit monitor third output to receive communications and an output connected to the third input of the first relay transmit monitor to supply status messages concerning the integrity of the received communications; and
- wherein the transmit monitor supplies the control signal to select a transmitter switch output in response to the status messages from the first and second receiver nodes.

* * * * *